Dec. 25, 1928.
A. MOND
1,696,810
RADIATOR FOR MOTOR CARS AND THE LIKE
Filed Feb. 12, 1926   3 Sheets-Sheet 1
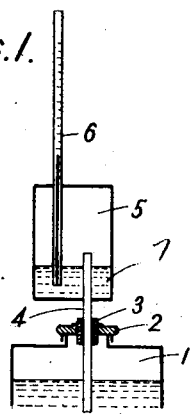
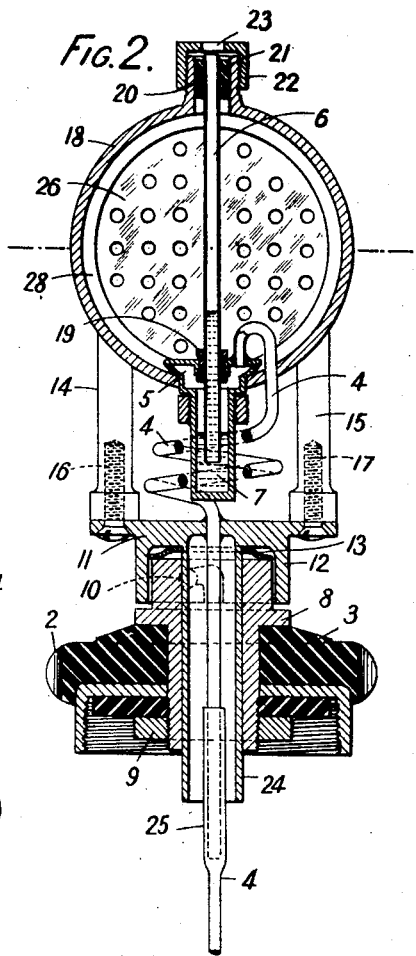
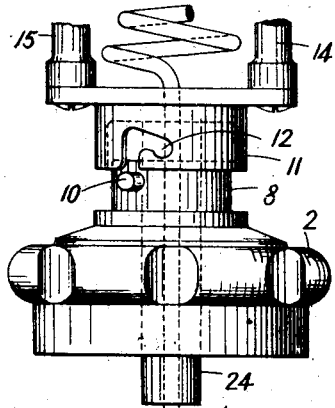
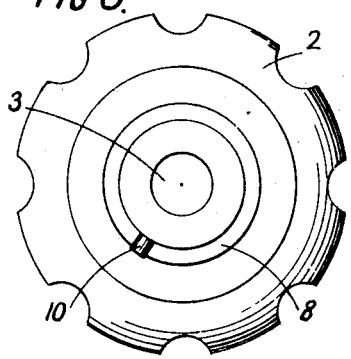
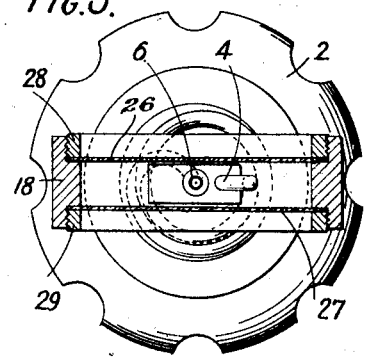
INVENTOR
Albert Mond
by Moses & Nolte
ATTORNEYS Dec. 25, 1928.　　　　　　　　　　　　　　　　　1,696,810
A. MOND
RADIATOR FOR MOTOR CARS AND THE LIKE
Filed Feb. 12, 1926　　　　3 Sheets-Sheet 2
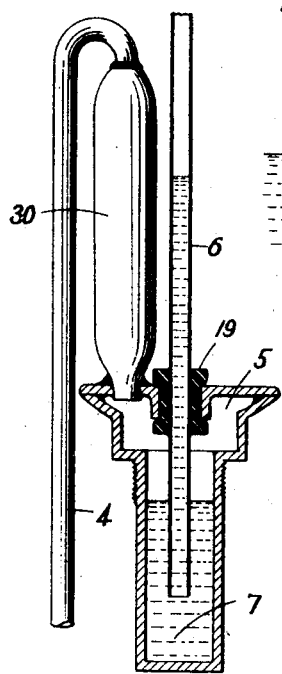
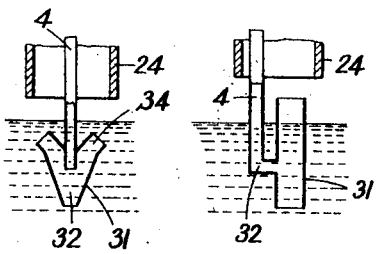
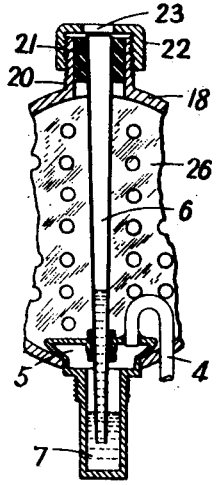
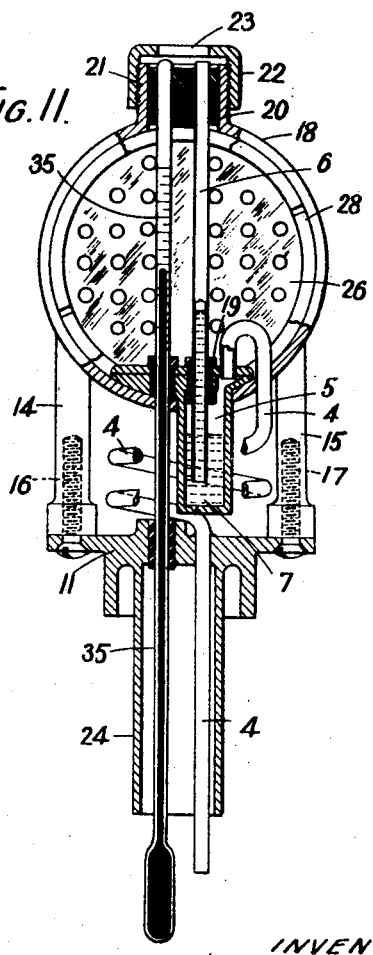

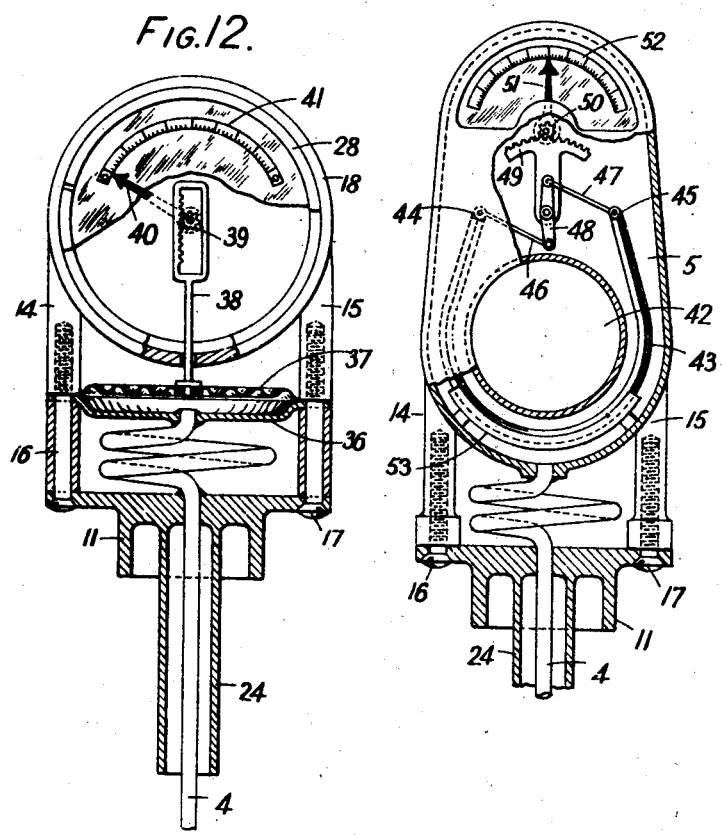

Patented Dec. 25, 1928.

1,696,810

UNITED STATES PATENT OFFICE.

ALBERT MOND, OF LONDON, ENGLAND.

RADIATOR FOR MOTOR CARS AND THE LIKE.

Application filed February 12, 1926, Serial No. 87,969, and in Great Britain February 17, 1925.

This invention relates to a device for indicating and/or adjusting the water level in radiators of motor-cars and the like.

One object of the invention is to provide means for indicating the liquid level in radiators of internal combustion engines of motor cars and the like arranged to cause a portion of the volume of the gaseous fluid displaced by the variations in said liquid level to give an indication of the actual level of the liquid in the radiator, and including means to compensate for the variations in volume of the displaced gaseous fluid.

Another object of the invention is to provide means which enable the radiator to be filled to the required level without removing the cap. These means are preferably combined with the liquid level indicator so that said indicator can be removed from the radiator cap to enable the radiator to be filled without removing the cap.

Finally another object of the invention is to combine the liquid level indicator with a temperature gauge measuring the temperature of the radiator water.

In the drawings:

Fig. 1 is a diagrammatic representation showing the principle on which the invention is based.

Fig. 2 is a sectional elevation of one form of construction.

Fig. 3 is a plan view of Fig. 2.

Fig. 4 shows the radiator cap with a bayonet joint.

Fig. 5 is a plan of the radiator cap showing the bore required.

Fig. 6 shows a sectional elevation of catch pot for use when a liquid-operated pressure gauge is employed.

In Fig. 7 shows an upwardly divergent indicator pipe for liquid-operated pressure gauges.

Fig. 8 shows a funnel shaped attachment for the pipe leading from the radiator to the hermetically closed chamber, adapted to prevent air bubbles entering said chamber.

Fig. 9 shows an open upright pipe provided with a band attached to the pipe leading to the hermetically closed chamber adapted to prevent air passing from the cooling liquid of the radiator to the hermetically closed chamber.

Fig. 10 shows a hermetically closed baffle attached to the pipe leading from the radiator to the hermetically closed chamber and adapted to prevent air bubbles passing into said chamber.

Fig. 11 shows a thermometer arranged adjacent to the cooling medium level indicator for simultaneously indicating the temperature and the liquid level of the radiator cooling medium.

Fig. 12 shows a hermetically closed chamber in the form of a very thin flexible metal box adapted to be distorted under the influence of pressure into which leads the pipe from the cooling water.

Fig. 13 shows a modification in which a Bourdon tube gauge is arranged within the hermetically closed chamber.

Referring to Fig. 1, 1 indicates a vessel, for example the radiator of a motor car containing water. 2 is the radiator cap which of course need not fit air-tight. The radiator cap 2 is provided with a bore 3 through which passes a tube 4, extending upwards for some distance into an hermetically sealed air vessel 5. A tube 6 is inserted through the top of said air vessel 5 and immersed with its lower end in a coloured liquid 7 contained in said air vessel 5. If the water level in the radiator remains stationary the meniscus in the tube 6 will remain stationary. If however, the water level in the radiator 1 sinks, the volume of water within the tube 4 sinks and thereby displaces a corresponding volume of air above said water and reduces the pressure in the air vessel 5, which is indicated by a fall of the coloured liquid in the tube 6.

In Fig. 2, 2 is the radiator cap provided with a bore 3 through which passes a socket or sleeve 8 which is threaded at its lower end and fixed to the radiator cap 2 by means of a nut 9. The sleeve 8 is provided with a pin 10 as shown in Figs. 4 and 5 and forms the spigot member of a bayonet joint. The socket member of said bayonet joint shown by 11, is provided with an angular slot 12 adapted to engage with the pin 10 of the spigot member 8 of the bayonet joint, springs 13 being provided to keep the parts 10 and 11 in firm engagement. Mounted upon the socket member 11 of the bayonet joint are two pillars 14 and 15, fixed by screws 16 and 17.

An annular frame 18 of metal or of heat-non-conducting material similar to an opened watch case is carried by said pillars 14 and 15. Said frame 18 carries at its bottom the pressure vessel 5, the sump of which is partly filled with a coloured liquid 7. A tube of glass, celluloid or other transparent material 6 dips into the liquid 7 in the pressure vessel 5. A stuffing box or rubber joint 19 is provided to insure hermetical closure of the part of the pressure vessel 5 through which the tube 6 passes. The upper end of the tube 6 is held in position by passing through a threaded extension 20 of the frame 18 provided with a washer 21 and held by a threaded socket 22 provided with a hole 23 above the open end of the tube 6.

Leading from the top of said air vessel 5 is a pipe 4 which passes in the shape of a coil into the cooling medium of the radiator through the centre of the socket member of the bayonet joint 11. The tube 4 is protected by a metal tube 24 which is fixed to or integral with the lower face of the socket member 11. The socket member 11 together with the tubes 24 and 4 and its pillar mountings 14 and 15 can be removed from the spigot member 8 of the bayonet joint by turning the whole apparatus slightly so that the slot 12 becomes disengaged from the pin 10. The pipe 24 can then be removed from the bore of the sleeve or spigot member 8 of the bayonet joint. By examining the end of the pipe 4 it can be ascertained to what level the radiator is filled independently of the indication in the tube 6. Water can then be supplied to the radiator if required through said bore without removing the cap 2.

The pipe 4 is provided with means 25 to adjust its depth of immersion into the cooling liquid of the radiator. The most simple means to permit adjustment is to cut the pipe 4 and interconnect the two ends by a rubber tube 25 or the end of the pipe 4 can be extended by a flexible pipe to conform to curved radiators.

The frame 18 as shown on Fig. 3 is provided with windows 26 and 27 of glass or other transparent material which are perforated so as to allow cooling air to pass therethrough. These windows 26 and 27 are held in position by threaded bezel rings 28 and 29, Fig. 3.

When the water indicator is not mounted on the radiator but kept in a horizontal or inclined position it may happen that the coloured liquid 7 in the pressure vessel 5 enters the pipe 4. To prevent this, a catch pot 30 as shown in Fig. 6 may be provided at any suitable point in the pipe 4 preferably on the top of the pressure vessel 5 as shown in Fig. 6. This also helps to cool the gaseous fluid displaced within the tube 4 by the variations of the water level in the radiator.

In some cases it may happen that air bubbles are formed in the indicator pipe 6 and these may make the reading inaccurate or may lead to a loss by ejection of the coloured liquid 7. To prevent this the indicator tube 6 may be made conically upwardly divergent, as shown in Fig. 7 or various other means may be provided for this purpose as will be explained hereinafter with reference to Figs. 8, 9 and 10 which show alternative means for preventing air bubbles formed in the radiator water to enter the pipe 4.

The dotted line in these figures represents the liquid in the radiator. In Fig. 8 the means consist of a funnel shaped attachment 31 for the pipe 4. Any air entering the opening 32 of said funnel shaped attachment 31 will leave through the openings 34 rather than enter the pipe 4.

In Fig. 9, the attachment 31 has the shape of an open upright pipe into which leads a bend 32 attached to pipe 4. Any air rising to the surface in the cooling water will pass through the open pipe rather than enter the bend 32 of the pipe 4.

In Fig. 10, the attachments 31 has the shape of an inverted conical baffle. Any air passing upwards will be displaced sideways and prevented from entering the pipe 4.

As previously stated the attachment 31 shown in Figs. 8, 9 and 10 can also be provided to the end of the pipe 6 to prevent air bubbles entering thereinto.

In Fig. 11 a thermometer 35 is arranged adjacent to the cooling medium level indicator 6, which thermometer may reach into the water.

In Fig. 12 the pressure of the gaseous fluid which is displaced by the variations of the liquid level of the cooling medium of the radiator, is measured by the alterations in the volume of a box 36 made of very thin metal of the kind used for aneroid barometers provided with corrugations 37 on one or both surfaces. Mounted on the upper surface of said box is a rack 38 of aluminium or other light material engaging with a pinion 39 on which a pointer 40 is fixed, which indicates the variations of pressure in the box 36 on a dial 41. As regards the other details of this embodiment they are similar to those described with reference to Fig. 2, i. e. a pipe 4 immersed in the cooling medium of the radiator is coiled at its upper end so as to compensate for the heat produced by the heated cooling water and terminates at the bottom of the aneroid pressure box 36.

In Fig. 13 the pressure chamber 5 is of horse-shoe shape and is provided with a circular open space 42 for the passage of cooling air. The chamber 5 is hermetically closed by metal leaving only a small circular slot open to show the position of the pointer on the dial. Arranged within the chamber 5 there is an evacuated horse-shoe shaped tube 43 the ends 44 and 45 of which are connected by levers 46 and 47, to the double arm lever 48 mounted upon a rack 49 engaging with a pinion 50 carrying a pointer 51 which indicates the variations in pressure in the pressure chamber 5 on a dial 52. If the cooling medium in the radiator sinks the pressure in the pressure box 5 is reduced and the legs 44 and 45 of the horse-shoe shaped Bourdon tube 43 move apart, thereby causing the rack 49 to move towards the right and displacing the pointer 51 towards the left. Below the Bourdon tube 43 a metal baffle plate 53 is arranged which acts as a cooler or condensing surface, on which any vapours carried away through the pipe 4 can condense, thus compensating for the increase in volume and consequent increased pressure in the pressure chamber 5 caused by the heat in the radiator cooling medium.

The other details of the embodiment of Fig. 13 are the same as those described with reference to Fig. 2.

In all constructions described the indication of the radiator liquid level is visible from the driver's seat in the case of motor cars. If the level should be too low, all that is necessary is to unlock the bayonet joint and pull the pipe 24 with the indicator out of the bore in the socket or sleeve 8. The bore of the sleeve can then be used for filling the radiator to the required level without removing the cap, whilst the end of the pipe 4 can be used for ascertaining the actual level of the cooling medium in the radiator by the extent to which the pipe 4 was immersed in said cooling medium, prior to its withdrawal.

I wish it to be understood that many embodiments may be made without departing from the scope of the invention. In the embodiments shown I have shown a cooling coil and other cooling means such as perforated windows in Fig. 2 and an open circular space 42, for compensating for the increase in volume of the radiator cooling water due to heating by steam escaping. This is necessary because if the pressure box 5 were heated it would show an increase in the level of the pipe 6 and yet the cooling medium in the radiator may actually be lower than it should be.

I claim:

1. Apparatus for automatically indicating the level of liquid cooling media in radiators of internal combustion engines of automotive vehicles, comprising a hermetically closed chamber containing a gaseous fluid, a pipe also containing a gaseous fluid leading from said chamber into the liquid cooling medium, cooling means in the path of said gaseous fluid in said pipe adapted to function under the influence of the air current when the automotive vehicle is in motion, whereby the effect of temperature variations on the gaseous fluid within said pipe and said chamber is diminished and means indicating the pressure in said chamber.

2. Apparatus for automatically indicating the level of liquid cooling media in radiators of internal combustion engines of automotive vehicles, comprising a hermetically closed chamber containing a gaseous fluid, a coiled pipe also containing a gaseous fluid leading from said chamber into the liquid cooling medium, and presenting a large cooling surface so as to function under the influence of the air current when the automotive vehicle is in motion, to diminish the effect of temperature variations on the gaseous fluid within said pipe and said chamber and means indicating the pressure in said chamber.

3. Apparatus for automatically indicating the level of liquid cooling media in radiators of internal combustion engines of automotive vehicles, comprising a hermetically closed chamber of very thin flexible metal adapted to be distorted under the influence of pressure and containing a gaseous fluid, a pipe also containing a gaseous fluid leading from said chamber into the liquid cooling medium, cooling means in the path of said gaseous fluid in said pipe adapted to function under the influence of the air current when the automotive vehicle is in motion, whereby the effect of temperature variations on the gaseous fluid within said pipe and said chamber is diminished and means indicating the distortion of said metal chamber.

4. Apparatus for automatically indicating the level of liquid cooling media in radiators of internal combustion engines of automotive vehicles, comprising a hermetically closed shallow chamber of very thin flexible metal adapted to be distorted under the influence of pressure and containing a gaseous fluid, a pipe also containing a gaseous fluid leading from said chamber into the liquid cooling medium and means indicating the distortion of said metal chamber said chamber being constructed and arranged to present a large cooling surface so as to function under the influence of the air current when the automotive vehicle is in motion, to diminish the effect of temperature variations on the gaseous fluid contained therewithin.

5. Apparatus for automatically indicating the level of liquid cooling media in radiators of internal combustion engines of automotive vehicles, comprising a hermetically closed chamber of very thin flexible metal adapted to be distorted under the influence of pressure and containing a gaseous fluid, a coiled pipe also containing a gaseous fluid leading from said chamber into the liquid cooling medium, and presenting a large cooling surface so as to function under the influence of the air current when the automotive vehicle is in motion, to diminish the effect of temperature variations on the gaseous fluid within said pipe and said chamber and means indicating the distortion of said metal chamber.

In testimony whereof, I affix my signature.

ALBERT MOND.